Oct. 5, 1926.
M. MAYER
1,601,976
BOWDIN CONTROLLER
Filed Dec. 15, 1924    2 Sheets-Sheet 1
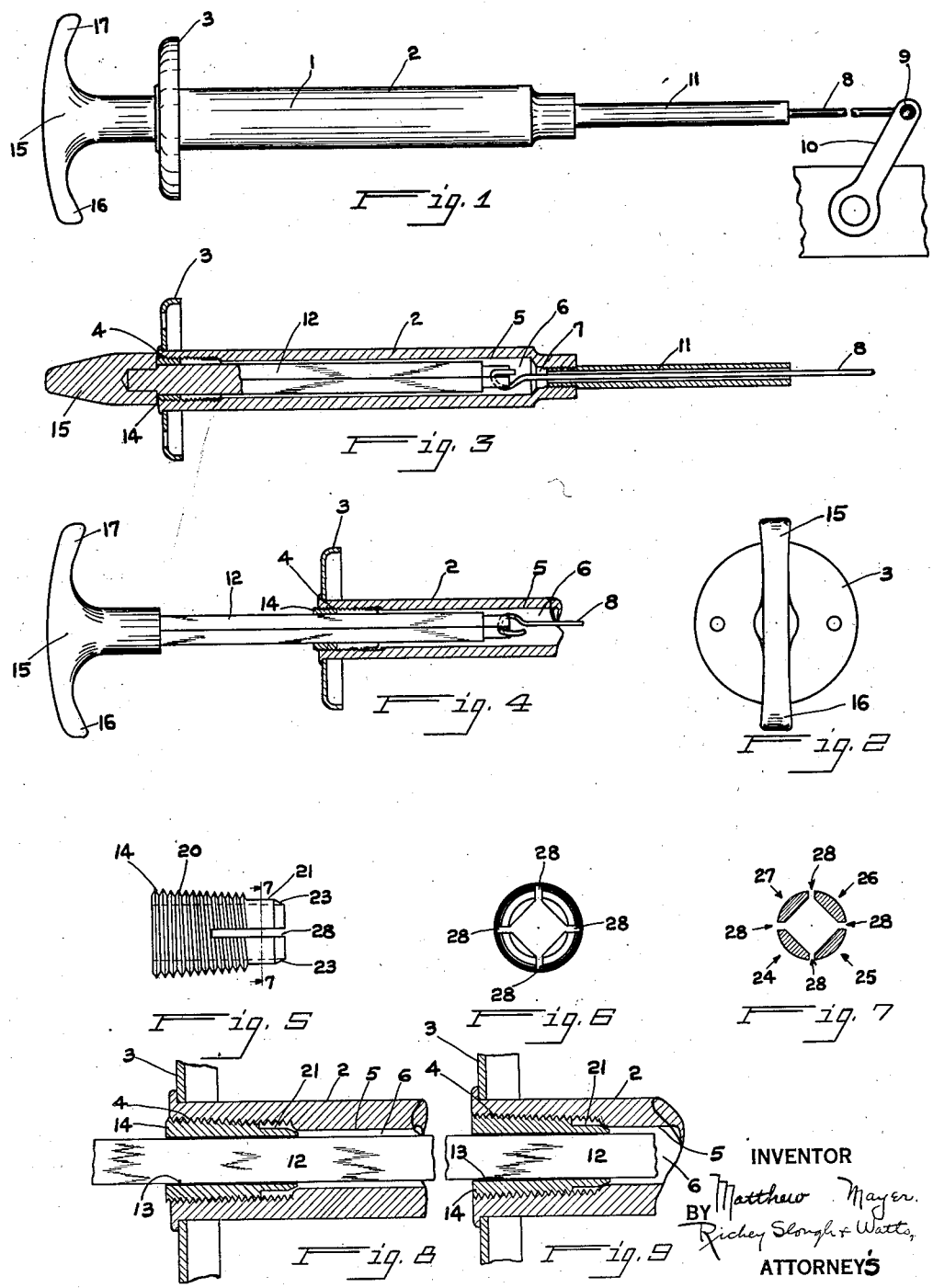

Oct. 5, 1926.

M. MAYER 1,601,976

BOWDIN CONTROLLER

Filed Dec. 15, 1924     2 Sheets-Sheet 2

INVENTOR
Matthew Mayer
BY
ATTORNEYS.

Patented Oct. 5, 1926.

1,601,976

UNITED STATES PATENT OFFICE.

MATTHEW MAYER, OF MANSFIELD, OHIO, ASSIGNOR, BY MESNE ASSIGNMENTS, TO HAINES MANUFACTURING CORPORATION, OF ROCHESTER, NEW YORK, A CORPORATION OF NEW YORK.

BOWDIN CONTROLLER.

Application filed December 15, 1924. Serial No. 756,167.

This invention relates to Bowdin controllers and relates particularly to a controlling mechanism which may be operated manually to reciprocate a Bowdin controlling wire which may, at its distant end, be attached to any movable portion of a mechanism such as a valve lever, or the like. Such arrangements are commonly used for adjusting the valves controlling the flow of fuel to an automobile engine and for other like purposes.

It is an object of the present invention to provide such a manually operable Bowdin controller mechanism as may be suitable to adjust a mechanism as a float valve of an automotive engine, and which, when used for such a purpose, will be capable of being mounted on the dash of an automotive vehicle.
Another object of the present invention is to provide such a controller as may be locked in any desired adjusted position whereby the Bowdin wire may be reciprocated a given degree and then locked in the adjusted position.

Another object of the present invention is to provide such a locking Bowdin controller mechanism as may be operated to move the Bowdin wire to adjusted position and then locked in such adjusted position by the use of only one hand by the operator.

Another object of the present invention is to provide a Bowdin controller which is capable of being manufactured inexpensively, but which will be of rugged construction and will be efficient in operation for long periods of use.

Other objects of my invention and the invention itself will become apparent as the description of an embodiment of my invention progresses and in which description reference will be had to the accompanying drawings forming a part of this specification.
In the drawings—

Fig. 1 shows a side elevational view of a preferred embodiment of my invention;

Fig. 2 shows an end elevational view of the said embodiment;
Fig. 3 shows a longitudinal medial sectional view thereof;

Fig. 4 shows a longitudinal medial sectional view of a portion of the mechanism, the parts being shown in "unlocked" position;

Fig. 5 shows a side elevational view of a collet forming a bearing and a portion of the locking mechanism;

Fig. 6 shows an enlarged front end view of the collet;

Fig. 7 shows a section thereof on the line 7—7 of Fig. 5;

Figs. 8 and 9 show respectively sectional enlarged views of the unclutched and clutched collet and rod with associated parts;

Figure 10:
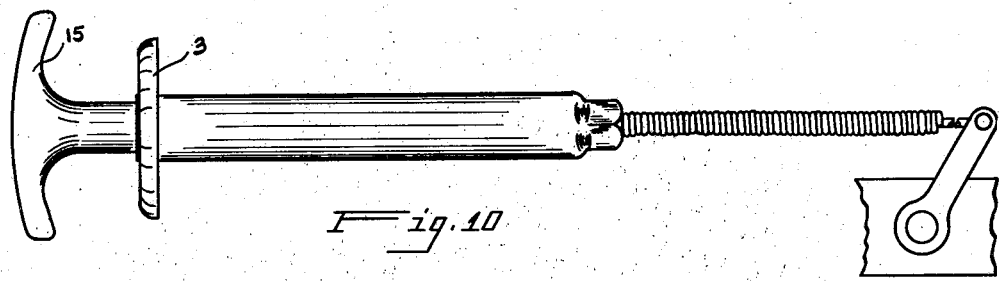
Fig. 10 shows a side elevation of another embodiment of my invention.

Referring now to the different figures of drawing and which illustrate one preferred form of my invention, and in which like parts are designated by like reference characters, at 1, I show a controller casing comprising a cylindrical shank 2 and a flanged head 3, the flanged head being cupped rearwardly at its periphery and the cylindrical shank 2 being internally threaded at 4 near the front end thereof, the threaded portion 4 being of larger internal diameter than the unthreaded portion 5 of the axial bore 6 extending through the casing, and which axial bore terminates in a reduced portion 7 at the rear end of the casing.

At 8 I show a portion of a Bowdin wire which it is the function of the controlling mechanism herein described to reciprocate, the distant end 9 of the Bowdin wire being attached to an adjustable element of mechanism such as the valve lever 10 herein described as being a lever movable to vary the valve opening of the throttle valve for an automotive engine.

It is understood that my invention comprehends the movement of any movable part having a plurality of different positions for any operative purpose and is not confined to any part of an automotive engine, or accessory thereto.

At 11 I show a tubular casing which is fitted tightly within the walls of the opening 7 for the casing 1 and provided for the purpose of assisting to preserve the alignment of the wire 8 which is usually of spring steel material, the tube 11 being preferably formed of brass, although it may be of any suitable material for the purpose, and my invention comprehends using any desired length of such tubing or of flexible tubing, the use of both kinds of tubing being well known in the art.

At 12 I show a rod of polygonal cross sectional shape in transverse sections, and herein the same is shown as being square in such cross section. It is only necessary that the same be of such shape relative to the bore 13 of a collet 14 through which bore the rod 12 passes, that the rod will be relatively non-rotatable to the collet 14. It is also preferable, as herein disclosed, that the rod 12 be of such size that it may be reciprocable with ease through the bore 13 of the collet when, as will be explained, the mechanism is in "unlocked" condition. A handle 15 is preferably integrally carried on the end of the rod 12 and preferably as shown has two laterally extending handle arms 16 and 17. The handle 15 may be formed integral with the rod 12 or may be joined on the end of the rod such as at point 18 by the rod 12 being driven tightly into a recess 19 of the handle 15, or it may be soldered, brazed or welded thereto in any well-known manner.

The collet 14 contains an enlarged preferably tapered threaded exterior portion 20 and a reduced end 21, the reduced end being tapered, that is, of gradually decreased exterior diameter towards its end wall 22. A constricting seat 23 is provided to the rear of the threaded portion 4 of the casing bore 6 adapted to engage the exterior walls of the collet tapered end 21, and when the collet 4 is threaded inwardly by the engaging threads 14 of the collet fitting within the internal threads 4 of the casing, and the collet rotated in such a direction as to move within the bore of the casing or towards the rear of the casing, the seat 23 will bear tightly against such reduced tapered end of the collet and cause the same to be constricted and make tight frictional contact with the engaged walls of the rod 12.

The constriction of the tapered end 21 of the collet is increased by the fact that this end is formed of four tongues, 24, 25, 26 and 27 by the cutting of the collet end preferably in the plane of its axis, there being preferably as shown two such transverse cuts or slots at right angles to each other, these slots being shown at 28. The collet is made of a good quality of spring brass or bronze or like material and the tongues are resilient and will regain their normal unstressed, non-gripping form when the collet is unscrewed from the threads of the casing a pre-determined amount. The mechanism of my invention is operated as follows—

Referring to Fig. 4 first, this figure shows the collet in retracted non-locking position, wherein the exterior walls of the tapered end 21 of the collet do not engage the seat 23 of the casing. When the parts are in this position, the wire 8 may be reciprocated at will to move the lever 10 to any desired adjusted position, but the reciprocation of the handle 15 and the consequent movement of the rod 12 by the end of the wire 8 is attached at one of its ends, the rod 12 in such case slipping easily through the internal bore 13 of the collet. The internal bore of the collet is as shown preferably polygonal in transverse sections corresponding with the form of the rod, but slightly larger when the collet is in normal unstressed condition. When the operator has reciprocated the wire 8 to a given desired position such as shown in Fig. 1, the parts can then be locked in this position of adjustment by merely rotating the handle 15 a slight amount in a clockwise direction, assuming that, as herein illustrated, the threaded portions 4 and 14 comprise right-hand threads. Such rotation will advance the collet 4 inwardly to cause the tapered end 21 of the collet to engage the seat 23 which will jam the tongues 21 inwardly and cause them to make tight frictional contact with the rod 12.

When it is desired to change the adjustment of the wire, it is necessary only to rotate the handle 15 counter-clockwise, moving the collect outwardly permitting the tongues 24 to 27 inclusive to expand to their unstressed position and then the rod 12 will be released and can be reciprocated to reciprocate the wire 8.

I find that in practice the operation of this mechanism is very convenient and that the locking portion of the mechanism does not so protrude from the casing front 3 as to cause it to be struck or to be noticeable to those who might desire to tamper with the mechanism, and while the apparatus is very efficient in operation, it is cheaply constructed being withal quite durable. The parts for the most part can be formed in an automatic screw machine, contributing to the cheapness of production.

Referring now to the modified form of my invention as shown in Figs. 10 to 15 inclusive, I provided in this embodiment an improved method of connecting the wires $8^1$ to the rod $12^1$ comprising a nut 41 having a centrally disposed small perforation 42 in its head to admit the end of the wire $8^1$ which is bent as shown at 43 within the cavity 44 of the nut. The wire $8^1$ is free to rotate in the perforation 42 and is prevented from being pulled from the cap 41 by the bent portion 43. To secure the wire $8^1$ to the rod $12^1$ it is then only necessary to thread the cap 41 onto the threaded end 45 of the rod 12¹. As shown in this modification also I may employ for the tube 11 a flexible tube 11¹ formed by a helix of spring wire, and when I so form the tube 11¹ by suitably threading the casing 2 at its end 7, internally, the helix 11¹ can be screw-threaded into the said threaded portion 7 to make a joint with the casing 2 thereat.

Figure 11:
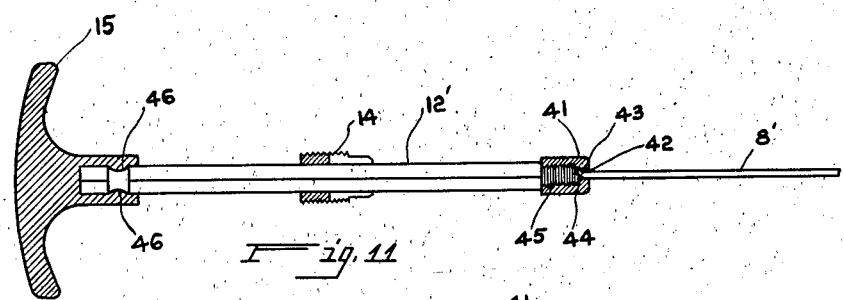
Fig. 11 shows the same partly in section with the casing removed.
Figures 13, 14, 15:
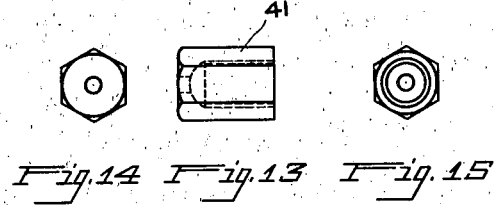
Fig. 13 shows an enlarged side elevation of a detail thereof.
Figs. 14 and 15 show enlarged front and rear elevations of the detail of Fig. 12.
Figure 12:
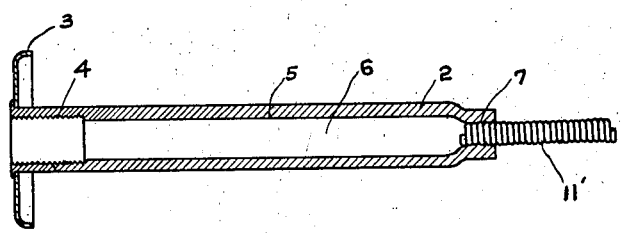
Fig. 12 shows a longitudinal medial sectional view of the casing.

In this embodiment also I show the other end of the rod 12¹ roughened as shown at 46 and the handle 15 is then die cast onto the end of the rod 12¹ as shown in Fig. 11. The operation of the embodiment of Figs 10 to 15 inclusive is the same as that of the other figures, the collet 14 being carried on the rod 12¹ being adapted to be screw-threaded into the forward end of the casing 2, the threads of the collet 14 engaging the internal threads 4 of the casing in the same way and for the same purpose.

Whereas I have shown the construction of the collet tongues in the present embodiment as being caused for the most part by the engagement of the tapered ends of the tongues with the seat on the internal wall of the casing, the desired result could be achieved less efficiently by omitting such seat and enlarging the bore of the casing to such an amount as to make its diameter substantially the same as the diameter of the adjacent threaded portion of the bore. In such case, the constriction of the tongues will be caused by the advancing of the collet within the threaded portion of the bore, the engaging threaded surfaces of the collet and bore being tapered inwardly so that this tapering will cause the constriction of the end of the collet. However, I prefer the construction herein illustrated and described for the reason that I may accomplish the clutching function by a very slight rotative movement, and the unclutching may be accomplished by a similar slight movement and without the likelihood of the parts binding so that considerable force would be required to unclutch the parts.

While I have described but a single embodiment of my invention for a better understanding thereof, I am aware that numerous and extensive departures may be made from the embodiment of my invention herein illustrated and described but without departing from the spirit thereof.

I claim:—

1. The combination with a hollow member and a rod operable longitudinally thereof and also mounted to turn therein, one of said parts having a screw threaded portion and a camming portion at one end of the screw threaded portion, of a clamping member arranged within said hollow member having a screw threaded portion operable on the screw threaded portion of the part hereinbefore mentioned and having a connection with the other part permitting a relative longitudinal movement between such other part and said clamping member, but constructed to prevent a relative turning movement between the clamping member and such other part, said clamping member having a tubular end portion split to provide a plurality of resilient clamping jaws provided at their ends with camming portions adapted to be moved into and out of engagement with the camming portion at the end of the screw threaded portion with which the screw threaded portion on the clamping member engages upon a relative turning movement between the two screw threaded portions.

2. The combination with a tubular member having internal screw threads and a camming portion at one end of the threads, of a hollow clamping member arranged within the tubular member and provided at one end with splits forming spring arms, the ends of which are formed with camming portions adapted to be moved into and out of engagement with the camming portions of the tubular member at the end of the screw threaded portion of the latter, and a rod guided in said hollow clamping member to move longitudinally thereof and having connection with the hollow clamping member to cause the hollow clamping member to turn with said rod to move the camming portions on the hollow clamping member into or out of engagement with the camming portions on the tubular member.

3. The combination with a hollow member and a rod operable longitudinally thereof and also mounted to turn therein, one of said parts having a screw threaded portion and a camming portion at one end of the screw threaded portion, of a clamping member arranged within said hollow member, having a screw threaded portion operable on the screw threaded portion of the part hereinbefore mentioned and having a plurality of flat faces for cooperating with the other part to permit relative longitudinal movement between the clamping member and such other part, but to prevent relative turning between the clamping member and such other part, said clamping member being split at one end at the junctions of the flat faces to provide a plurality of clamping jaws and having at the ends of said clamping jaws camming portions for cooperating with the camming portion at the end of the first mentioned screw threaded part.

4. In a Bowdin wire controlling mechanism, the combination with a rod, a Bowdin wire secured at one end of the rod and a handle at the other end of the rod, a casing having a longitudinal bore, said rod passing through the bore, a collet screw-threaded within the casing bore and forming a bearing for the rod, and being non-rotatable relative to the said rod, and means within the casing adapted to engage a portion of the said collet to cause it to clutch the said rod frictionally when the collet is rotated by the rod a predetermined amount, said casing having a flanged head, the threaded portion of the casing bore being disposed adjacent the head.

5. In a Bowdin wire controlling mechanism, the combination with a plunger, a Bowdin wire secured at one end of the plunger and a handle at the other end of the plunger, a casing having a longitudinal bore internally threaded near one end thereof, said plunger passing through the bore, a collet externally threaded and adapted to be threaded into engagement with the threaded portion of the said bore, and forming a bearing for the plunger, a plate forming a head for the end of said casing adjacent the threaded section of the bore, said plunger and said collet being non-rotatable relative to each other, and a seat formed within the base adapted to engage an end of said collet to cause it to clutch the said plunger frictionally when the collet is rotated by the plunger a predetermined amount, the outer end of said collet being flush with the outermost portion of said plate on the casing end to permit full reciprocation of the plunger when the latter is unlocked.

In testimony whereof I hereunto affix my signature this 8th day of December 1924.

MATTHEW MAYER.